(12) United States Patent
Kam et al.

(10) Patent No.: US 6,968,320 B1
(45) Date of Patent: Nov. 22, 2005

(54) DATA INTERPRETER FOR RBOC BILLS

(76) Inventors: Claudine Kam, 16 Coldhill Rd., Morris Plains, NJ (US) 07950; Julia Cheng-Kuk, 2122 Tellis La., Lisle, IL (US) 60532

( * ) Notice: Subject to any disclaimer, the term of this patent is extended or adjusted under 35 U.S.C. 154(b) by 0 days.

(21) Appl. No.: 09/514,736

(22) Filed: Feb. 28, 2000

(51) Int. Cl.[7] .............................................. G06F 17/60
(52) U.S. Cl. ......................................... 705/40; 705/36
(58) Field of Search ............... 205/25–40; 379/112.01, 379/114.01–114.03; 705/36–40

(56) References Cited

U.S. PATENT DOCUMENTS

| | | | | |
|---|---|---|---|---|
| 5,732,127 A | * | 3/1998 | Hayes | 705/40 |
| 5,832,068 A | * | 11/1998 | Smith | 705/40 |
| 5,920,846 A | * | 7/1999 | Storch et al. | 705/7 |
| 6,005,926 A | * | 12/1999 | Mashinsky | 705/40 |
| 6,011,837 A | * | 1/2000 | Malik | 705/40 |
| 6,052,447 A | * | 4/2000 | Golden et al. | 705/40 |
| 6,072,493 A | * | 6/2000 | Driskell et al. | 345/854 |
| 6,084,953 A | * | 7/2000 | Bardenheuer et al. | 379/114.01 |
| 6,144,726 A | * | 11/2000 | Cross | 705/40 |
| 6,199,068 B1 | * | 3/2001 | Carpenter | 705/40 |
| 6,337,901 B1 | * | 1/2002 | Rome et al. | 705/40 |
| 6,421,727 B1 | * | 7/2002 | Reifer et al. | 705/40 |

FOREIGN PATENT DOCUMENTS

WO    WO 009613814 A1  *  5/1996

OTHER PUBLICATIONS

"RBOCS Begin To Cash In On Open Local Markets In Other Regions", Telco Business Report, v 12, n25, Dec. 18, 1995, Dialog file 16, Accession No. 04120000.*

* cited by examiner

Primary Examiner—Frantzy Poinvil

(57) ABSTRACT

A data management method and system to more correctly bill a customer of a reseller of telephone service, based on wholesale billing data of a telephone company. The wholesale billing data is divided into many very small parts, or cells, of information. The system accesses one cell of information at a time, and excludes a portion of the accessed information from subsequent data manipulation. Then, the system transforms the un-excluded information from one data format to another data format. The wholesale billing data can be in EBCDIC data format and the tabulated data is not in the EBCDIC data format. The tabulated data can be in a personal-computer data format. After transformation, the system generates tabulated data from the un-excluded wholesale billing data based on at least a user-preference. The tabulated data is then compared to the reseller's internally generated billing information to correct mistakes in the bills to the customer.

8 Claims, 9 Drawing Sheets

0450560000000000038888NJ00000008888NJ000000097323248690000
000000000000009902019325      000000000
NJ                                    0000
010101990114109732324869000109734575892000654000000000135
329003602402003200001410000001030000081000100097392132097
32324869MORRISTOWNNJSYRACUSE
NJK98000000000100990000000000000

FIG. 1C

DATA INTERPRETER FOR RBOC BILLS

BACKGROUND OF THE INVENTION

The present invention relates generally to a data interpreter, and more specifically to a data interpreter, which interprets the raw billing data from Regional Bell Operating Companies using personal computers.

To increase competition and reduce cost to consumers, the Telecommunications Reform Act of 1996 requires telephone companies, such as the Regional Bell Operating Companies, to sell local telecommunication services to resellers at rates lower than what they would otherwise offer directly to end users. With the Regional Bell Operating Companies providing a sense of security and dependability, without such laws, it would be extremely difficult for resellers to compete with them. Even if the prices among the Regional Bell Operating Companies and the resellers are the same, it is unlikely that a typical consumer would go to the resellers, instead of the well-established Regional Bell Operating Companies for services.

The Regional Bell Operating Companies have to allocate some of their capacities for the resellers, who can then sell telecom services directly to the consumers or end-users. When an end-user buys such services from a reseller, actually the end-user is buying the services from the Regional Bell Operating Companies, with the resellers serving as intermediaries. To differentiate themselves from the Regional Bell Operating Companies, the resellers typically provide additional services like long distance or Internet services.

On a monthly basis, the Regional Bell Operating Companies send to the resellers, wholesale invoices that indicate the types of services that each of their end-users has subscribed to and how much the resellers have to pay. Some resellers compare the wholesale invoices from the Regional Bell Operating Companies with their internally-generated bills. Both sets should reconcile to ensure accurate billings from the resellers to the end-users. Such a reconciliation process happens to be a very difficult task for small resellers.

The Regional Bell Operating Companies' wholesale invoices to the resellers can include hardcopies and softcopies. The hardcopies can be just a few numbers indicating the exact amount a reseller has to pay, or the hardcopies can be quite voluminous if the Regional Bell Operating Companies are willing to provide the reseller with details. If the hardcopies include only the exact amount, they would not be that useful to the resellers. For the detailed version, to manually compare the hardcopies with the resellers' internally-generated bills, column-by-column and cell-by-cell, and not to expect mistakes, is unreasonable. The best way to compare should be through the softcopies. However, extracting appropriate information from the softcopies is a challenging task.

For at least four of the Regional Bell Operating Companies, known hereinafter as the RBOCs-Bell Atlantic North, Bell Atlantic South, Bell South and Ameritech-the softcopies consist of rows and rows of texts of raw data in a mainframe-computer data format, such as EBCDIC format. The term EBCDIC typically stands for 'Extended Binary Coded Decimal Interchange Code'. This is an 8-bit code having 256 combinations that stores one alpha-numeric character or two decimal digits in one byte. Each row can be a long and continuous string of alphanumeric characters.

The RBOCs also provide resellers with record layouts describing the raw data or data specifications. The record layouts can be as thick as a telephone book. The layout can include thousands of identifiers, and each RBOC can use different identifiers for the same type of raw data. The data is usually separated into very small parts, which can be known as cells or record types. All of the cells might be of one size, such as 450 bytes or 225 bytes, and may only be partially filled with data. The size of each cell is typically defined in the record layouts.

The softcopies can be as large as 500 Mega bytes. Not only do they include information regarding services provided to the end-users, they also include tremendous amount of irrelevant information, such as information related to the networking environment, historical information or billing information with no charges. Out of the thousands of distinct identifiers, there may just be 20% of them that are related to the billing information. This makes the softcopies very difficult to decipher, let alone use.

The soft copies are generally generated by main frame computers of the RBOCs. Since the raw data is in mainframe data format, one can use mainframe computer programming languages to categorize them based on information in the record layouts. One can then query and extract relevant billing information using query languages.

However, small resellers typically do not have the luxury of using mainframe computers. They have personal computers. With millions of characters, characterized by thousands of identifiers in mainframe computer data formats, the RBOCs' wholesale invoices are extremely difficult to be analyzed by personal computers.

Thus, most resellers just give up trying to reconcile the RBOC wholesale invoices with their internally-generated bills. There may be significant errors in the resellers' bills to their customers. It is not uncommon to have inconsistencies between the RBOCs' bills and the resellers' bills of more than 20%. Many resellers are currently losing 10 to 20% of their margins just due to such billing inaccuracy.

It should be apparent from the foregoing that there is still a need for an apparatus and method to interpret the raw billing data from the RBOCs using personal computers technologies. With typical resellers only having access to personal computers, such an apparatus and method would help them compete more effectively with the RBOCs. This, in turn, will increase competition against the RBOCs and give consumers more choices of local service providers. Eventually, such competition will drive down prices of local telephone services, ultimately benefitting the general public.

SUMMARY

The present invention is on methods and apparatus to more correctly bill a customer of a reseller of local telephone service without the need for a mainframe computer. On a monthly basis, the RBOCs send to the resellers billing information. The amount of data involved is quite large. It is not to the RBOCs advantage to help the resellers understand details in the billing information or to solve billing problems for the resellers. By requiring only personal computer technologies, which typical resellers have, this invention helps the resellers analyze the resale data from the RBOCs. Through the present invention, many resellers have saved millions of dollars from correctly billing their customers. Such savings significantly enhance their position to more effectively compete against the RBOCs.

One embodiment of the present invention includes an accessor and a generator, both in a personal computer. The accessor accesses the resale data from the soft copies provided by the RBOCs; and the generator generates tabulated data from the resale data based on at least a user-preference.

A large amount of information in the resale data is excluded, keeping essentially information related to telephone services provided to the end users. So, the tabulated data is of a much smaller size than the resale data.

The resale data and the tabulated data are in two different data formats, with the resale data in a mainframe computer data format, and the tabulated data in a personal computer data format. For example, the tabulated data is in ASCII data format and the resale data in EBCDIC data format. In one embodiment, the mainframe computer has at least ten times more memory capacity and at least ten times higher computation speed than the personal computer.

In one embodiment, the accessor and the generator are operated from one user interface. A user only has to work with one interface to access and analyze the raw data, and to analyze the tabulated data from the raw data. The interface can be the Microsoft Access.

Typically, the reseller has internal information regarding charges of the telephone service provided to the customer. Such internal information may not be as accurate as the wholesale billing data because it is the telephone company that is actually providing the service. One embodiment further includes a comparator configured to compare at least some of the tabulated data with at least a portion of the reseller's internal information for correctly billing the customer. The process of comparison typically depends on descriptions related to Universal Service Ordering Code.

In another embodiment, the wholesale billing data includes at least three subsets of data, namely, monthly recurring charge data, usage summary and toll usage details. The monthly recurring charge data includes billing telephone numbers and station numbers; the usage summary includes billing telephone numbers; and the toll usage details include station numbers.

Note that the language used in the specification has been principally selected for readability and instructional purposes, and may not have been selected to delineate or circumscribe the inventive subject matter. Also, the features and advantages described in the specification are not all-inclusive. Other aspects and advantages of the present invention will become apparent to one of ordinary skill in the art, in view of the specification, which illustrates by way of example the principles of the invention.

BRIEF DESCRIPTION OF THE DRAWINGS

FIGS. 1A–C show examples of strings of text of wholesale billing data from an RBOC.

Same numerals in FIGS. 1–6 are assigned to similar elements in all the figures. Embodiments of the invention are discussed below with reference to FIGS. 1–6. However, those skilled in the art will readily appreciate that the detailed description given herein with respect to these figures is for explanatory purposes as the invention extends beyond these limited embodiments.

DETAILED DESCRIPTION OF THE INVENTION

For each billing period, the RBOCs send to each reseller of telephone services hard and soft copies of data related to billing the end users of the services. The data involved is quite large. It is not uncommon to have the wholesale billing data of the size greater than 0.5 Gigabytes. Not only does the data include information related to billing, the RBOCs send to the resellers tremendous amount of other information. Typically, more than ninety percent of the information on the wholesale invoices is not relevant to phone charges. For example, they can be related to networking issues, historical information or nonchargeable items.

The RBOCs do not have to make it easy for the resellers to understand the billing information. The resellers are captured audience. They do not have much options because they have to buy the services from the RBOCs.

The resale data is very difficult to decipher. It can be in the form of a text file, generated by a mainframe computer in a data format such as EBCDIC, with its specific configurations. It is not uncommon to have strings and strings of text, with each string being a continuous stream of alphanumeric characters. FIGS. 1A–C show examples of such strings. Imagine trying to understand and use 0.5 Gigabytes of such data. It is a difficult task, especially when most of the information is not needed for billing purposes.

In one embodiment, the data is typically separated into very small parts, such as parts each having 450 bytes. FIGS. 1A–C represent three such examples of 450 bytes, each with a lot of blank spaces. To simplify discussion, a very small part in this disclosure is known as a cell. If the entire data set is 0.5 Gigabytes, a cell of 450 bytes is less than 0.0001% in size of the data set. In one embodiment, a very small part of the entire data set or a cell is less than 0.1% in size of the entire data set. In another embodiment, a very small part of the entire data set or a cell is less than 0.01% in size of the entire data set. Some of the cells may be totally filled with data, and some may not. All of the data within a cell may not be relevant for billing purposes. As an example, for a cell having 450 bytes, the resellers may not need 350 bytes for billing.

Figure 2:
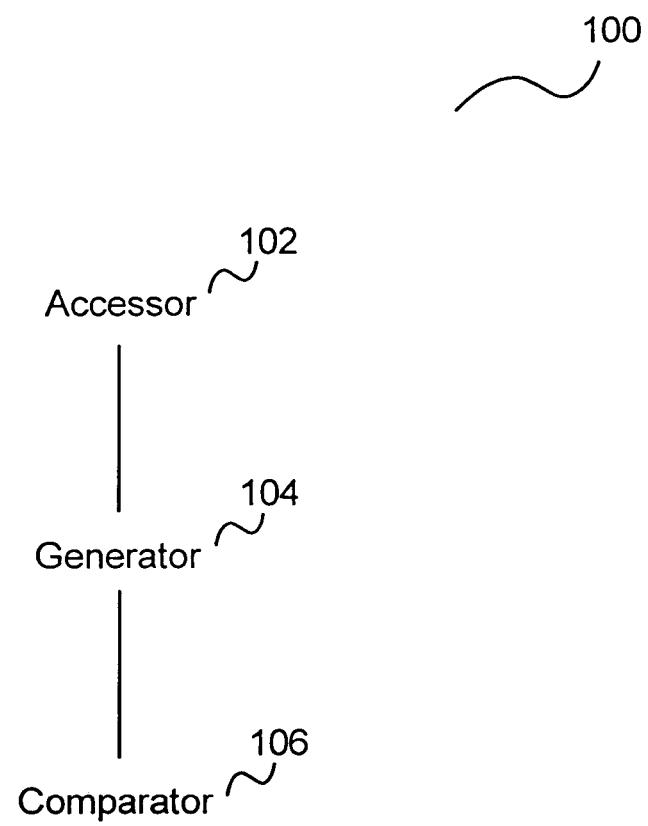
FIG. 2 shows one apparatus of the present invention.
Figure 3:
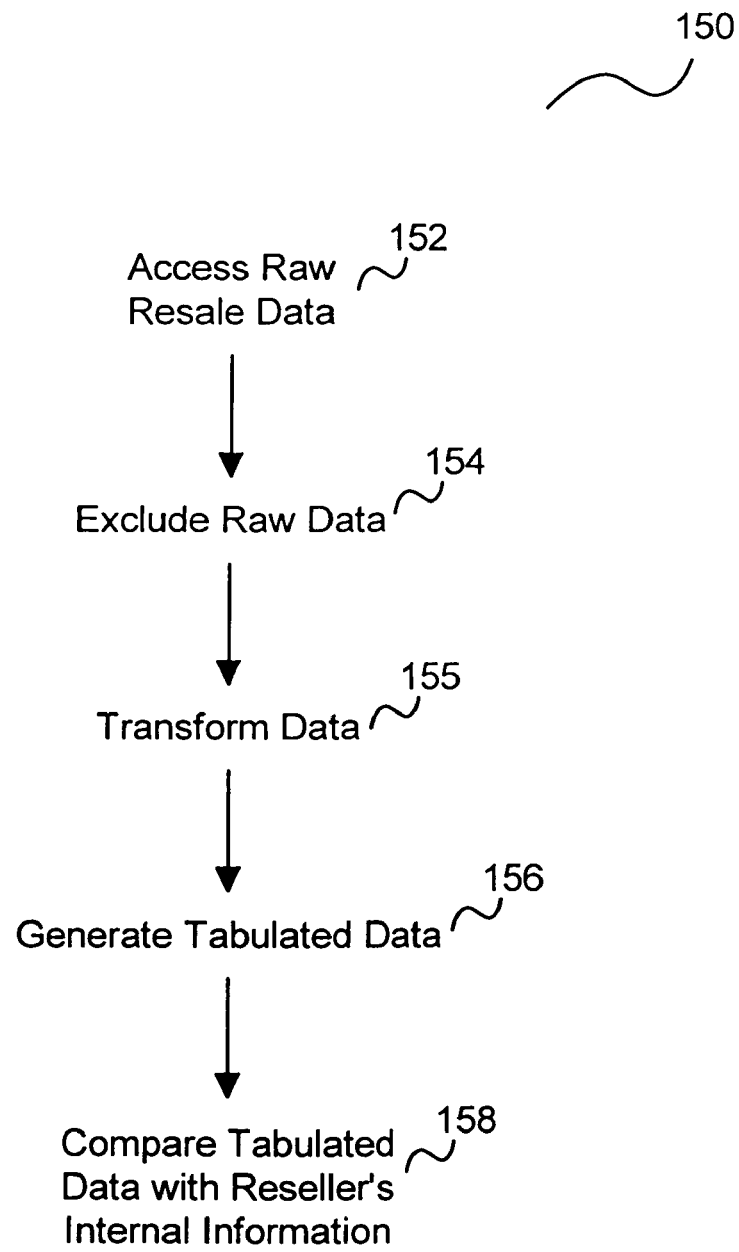
FIG. 3 shows one set of steps as implemented by the embodiment shown in FIG. 2.

FIG. 2 shows one embodiment, 100, of the present invention. It includes an accessor 102 and a generator 104; both can be in a personal computer. They can be software modules or can be implemented in circuits, such as programmable logic array chips. In the present invention, a personal computer can denote a computer with less computation power and memory capacity than a mainframe computer. For example, a personal computer can have ten times less computation power and ten times less memory than a mainframe computer.

The accessor 102 accesses (Step 152 in FIG. 3) the wholesale billing data. In one embodiment, the wholesale billing data is in a storage medium or in a database. The storage medium may be a compact disk in a compact disk drive. The accessor can access from the storage medium one cell at a time. The information may be accessed serially. In other words, the computer does not have to download all of the wholesale billing data, before analyzing them. Such a process of accessing one cell at a time significantly reduces the amount of memory required in the computer. Also, such a process allows the use of software programs that can only handle limited amount of data.

The wholesale billing data was typically generated by a mainframe computer. However, the accessor 102, residing in a personal computer, is written in personal computer applications, in programming languages such as COBOL. In one embodiment, based on information on the data format, such as how a sign bit is represented in mainframe formats, the resale data is analyzed using personal computer applications in COBOL.

After each cell is accessed, it is analyzed. It is not uncommon that most of the information in a cell is excluded from subsequent data manipulation (Step 154). The analysis is based on a record layout or mapping information, identifying the data. The layout is supplied by the telephone companies and can be as thick as a telephone book. As an example, after 450 bytes are accessed, based on information in the record layout, the first 400 bytes are not relevant. They are not needed to define how much an end user has to be billed. Only the remaining 50 bytes are analyzed. The first 400 bytes are not further manipulated. In one embodiment, when the next 450 bytes are accessed, they will be written to the same memory location as the previous 450 bytes. The previous 450 bytes will be overwritten by this next 450 bytes. In other words, this next 450 bytes are stored in the same memory space occupied by the previously-accessed 450 bytes. Such an embodiment conserves memory space.

Figure 4:
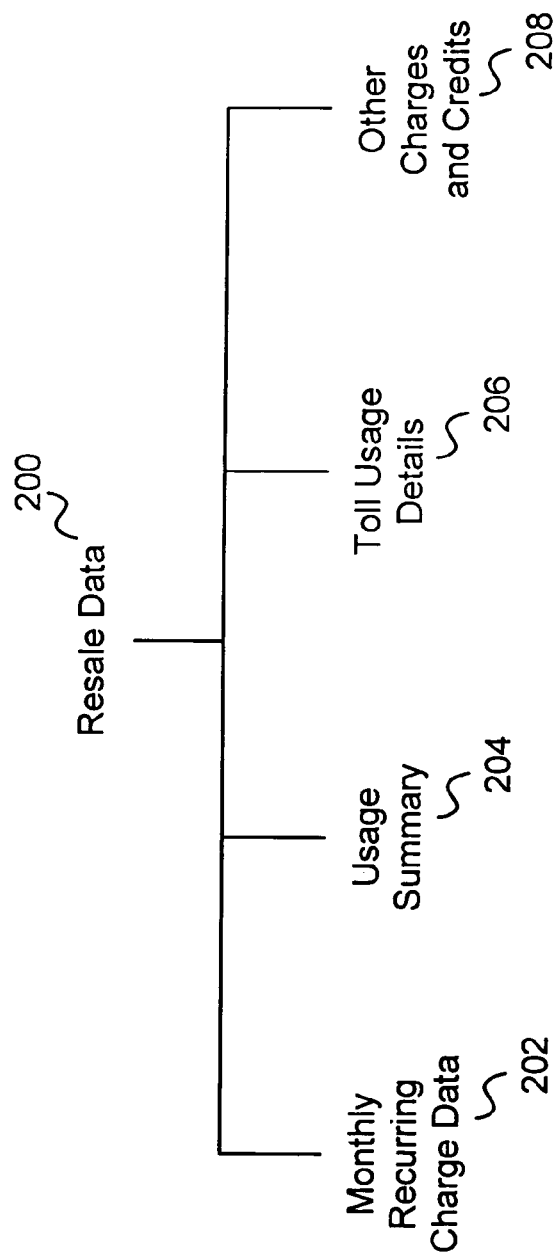
FIG. 4 shows subsets of resale data of the present invention.

FIG. 4 shows one embodiment of the wholesale billing data, 200, which includes 4 different subsets of data, namely, monthly recurring charge data (MRC), 202, usage summary, 204, toll usage details, 206, and other charges and credits (OCC), 208, which include fractional charges and non-recurring charges, such as telephone installation fee. Some RBOCs combine the MRC data and the OCC data into one data set.

Figure 5A:
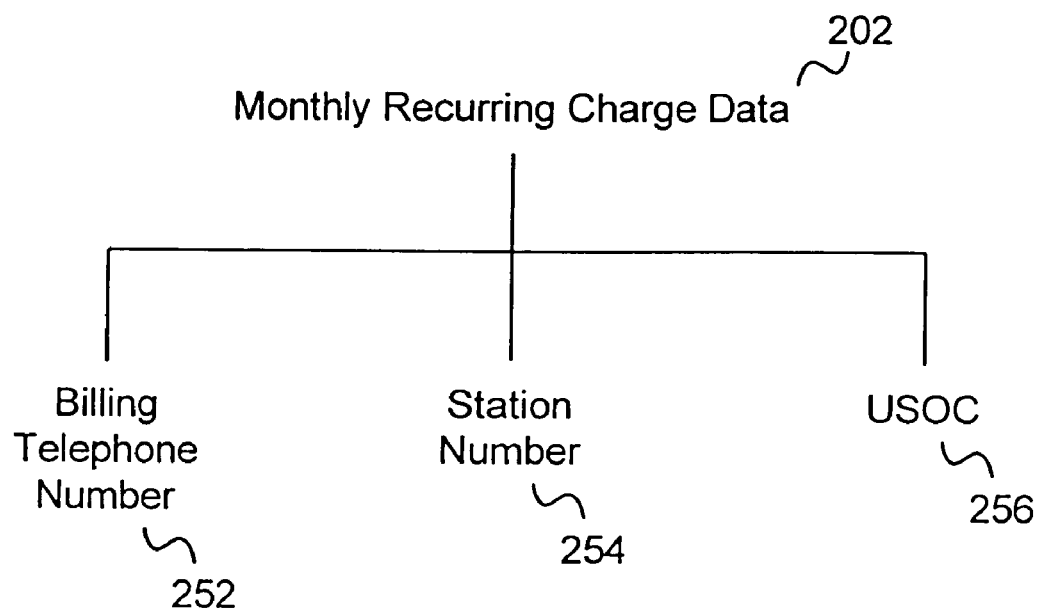
FIGS. 5A–C show informations in the subsets of the wholesale billing data of the present invention.
Figure 5B:
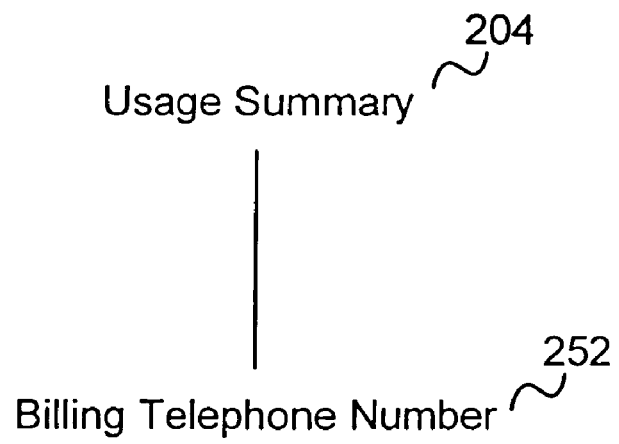
Figure 5C:
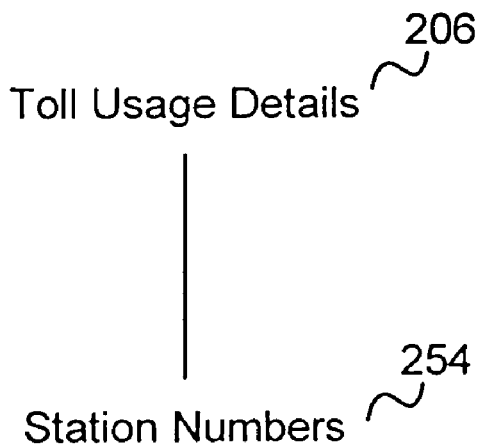

FIGS. 5A–C show examples of information in subsets of the wholesale billing data. Each subset of data includes specific fields. For example, the ARC information, 202, can include the billing telephone numbers, 252, the station numbers, 254, and the Universal Service Ordering Code (USOC), 256. The station numbers denote the different number of extensions for a main phone number in a particular location. Each extension has its unique station number. For billing purposes, typically, a customer paying for the bills of a main telephone number is responsible for each of the station numbers connected to that main telephone number.

Each USOC can represent a certain type of telephone line, calling feature or usage package. The RBOCs usually have their individual codes to represent the same services. Note that the record layout usually does not explain what the USOC codes are. The layout might indicate that certain bytes within a cell denote a specific USOC code. Some RBOCs include descriptions or identifications for the USOCs embedded in the wholesale billing data. The USOC can be used to match resellers' internally generated bills to the wholesale billing data.

The usage summary, 204, can include the billing telephone numbers, 252, the number of calls or the duration of the calls, and the usage amount. Toll details, 206, include station numbers, 254, date of calls and other information related to the calls. One method to link the usage summary to the toll details is through the MRC data set. The usage summary discloses the billing telephone numbers, the toll details discloses station numbers, and the MRC information can link the two sets of information together.

The other charges and credits data (OCC) can include the billing telephone numbers and recurring or non-recurring charges. It is not uncommon for resellers to miss the non-recurring charges, causing errors in the bills.

In one embodiment, information regarding a the monthly recurring charge data within the wholesale billing data is identified through the following process. Within a cell, identify (a) a billing telephone number or a station number, which can be a 10-digit numeric number, (b) a piece of 5-character long alpha numeric data, which can be the USOC, (c) a USOC quantity, such as the number of times that USOC service has been used, which can be a 9-digit numeric number, and (d) a USOC rate, which can be a 11-digit numeric number. This process can be done manually by a person, or automatically by a rule-based program. As long as the rules have previously been defined, implementing such a rule-based system should be obvious to those skilled in the art. The length of the USOC, in the above example being 5 characters long, is a standard set by the industry. An example of a USOC is "1FB". What the USOC represents can be found in another cell. For example, in another cell, one can find the strings "1FB" and "business line". This implies that 1FB represents a business line.

As discussed, after each cell is accessed, it can be analyzed based on the record layout. In most situations, more than 80% of the data in each cell can be excluded from subsequent data manipulation. If one can use a mainframe computer, with significant amount of storage space, one may download all of the wholesale billing data before the analysis. One embodiment of the present invention excludes a significant portion of the data, essentially keeping only information related to billable, or chargeable, services provided to the customers. The wholesale billing data includes not just telephone billing information but also networking information, historical information and non-chargeable information. Also, the cells are for many different purposes and are typically all of one size. A lot of space within each of the cells may not be used. As an example, the raw wholesale billing data can be 0.5 Gigabytes. After the excluding step, there may only be 20 Megabytes left for subsequent data manipulation.

The accessor 102 then transforms (Step 155) the un-excluded data in each cell into a different type of data formats, such as ASCII, for the personal computer. In one embodiment, the different type of data formats is a standard personal computer data format. There can be different forms of ASCII, such as ANSI (Windows) Delimited Text, ANSI Windows Text, ASCII (DOS) Delimited Text and ASCII DOS Text. In this application, the transformed data is known as intermediate data. By understanding the two sets of data formats, the accessor can map the un-excluded data from one data format to another data format. This transformation process can be done one character at a time. Such a transformation process should be known to those skilled in the art, and will not be further described.

After the transformation, the intermediate data can be processed by personal computer application programs. In one embodiment, the generator 104, which can include a database management program such as Microsoft Access Application, operates on the intermediate data. This again can be done, a cell at a time, allowing programs such as Microsoft Access to operate on the data.

The generator 104 can generate (Step 156) tabulated data from the intermediate data. The entries to the tables can depend on the data type. In one embodiment, at least one entry is based on at least a user preference. For example, one user preference is that all directory assistance calls should be highlighted. Another user preference can be that the billing telephone number and the working telephone number (or station number) should be next to each other. A third preference may be that a billing telephone number, and its monthly recurring charge should be in the same table. Since the tabulated data is based on the intermediate data, the tabulated data also does not hold as much memory as the resale data.

Figure 6A:
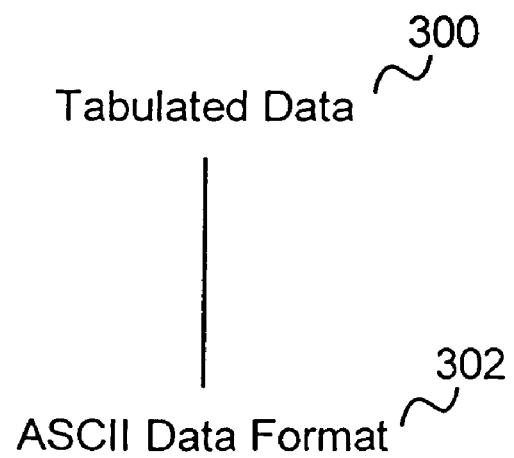
FIGS. 6A–B show examples of tabulated data format and resale data format in the present invention.
Figure 6B:
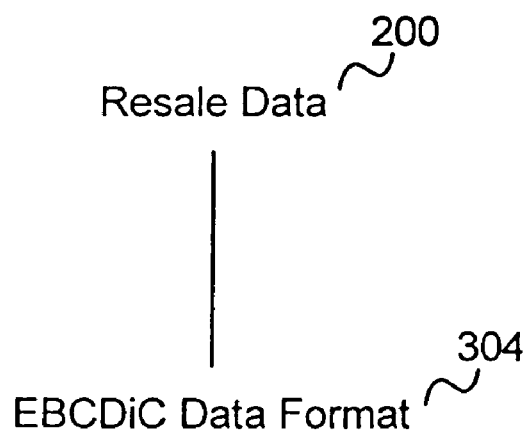

The tabulated data and the intermediate data are in a different data format from the wholesale billing data, with examples shown in FIGS. 6A–B. The wholesale billing data, 200, can be in a mainframe computer data format; and the tabulated data, 300, with the intermediate data, can be in a personal computer data format. For example, the tabulated data, with the intermediate data, is in ASCII data format, 302, and the wholesale billing data in EBCDIC data format, 304.

In one embodiment, to further save memory space, the intermediate data is deleted after the generator 104 has generated the tabulated data.

In another embodiment, only one user interface is needed to generate the tabulated data from the wholesale billing data. A user using this embodiment only has to work with one interface. The user can start the process by accessing the wholesale billing data from a database or other storage system, one or a few cells at a time. Then, the accessor 102 and the generator 104 operate on the accessed data to generate tabulated data from the wholesale billing data. In one embodiment, the interface can be Microsoft Access, which can read and execute executable codes from Windows programs. The user can use Microsoft Access to activate a Window program to access, delete and transform data in a cell to generate the intermediate data. In one embodiment, the Window program includes the accessor and the generator, and can be written in COBOL. Then, Microsoft Access can tabulate the intermediate data to generate much more user-friendly billing information.

Typically, the reseller has internal information regarding charges of the telephone services provided to the end-users. Such internal information may not be as accurate as the wholesale billing data. One reason is that it is the RBOCs providing the telephone services. They are the holder of the original information. Furthermore, they typically have much more resources and experience than resellers in managing data inventory.

One embodiment further includes a comparator 106 configured to compare (Step 158) at least some of the tabulated data from many cells with at least a portion of the reseller's internal billing information for correctly billing the customer. In another embodiment, the comparison step occurs after all of the cells of the wholesale data have been operated on by the accessor 102 and the generator 104.

Since both the tabulated data and the reseller's internal billing information are in a personal computer data format, the comparator can use personal computer application programs to perform the comparison process.

In one embodiment, the process of comparison can depend on descriptions related to Universal Service Ordering Code. For example, one USOC denotes caller ID. Information in the tabulated data with that caller ID is then compared to information in the reseller's internally generated billing information with the same caller ID. Such an identification helps comparing the wholesale billing data with the reseller's internally generated billing information.

Based on such comparisons, the reseller can correct mistakes in its internally-generated bills to more accurately bill the end-users. Based on the present invention, a number of resellers have identified mistakes in their bills in the order of 10 to 20% of their total revenue, saving them millions of dollars due to billing errors.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A data management apparatus to more correctly bill a customer of a reseller of telephone service, based on wholesale billing data of a telephone company and the reseller's internal billing information regarding charges of the telephone service for the customer, the system comprising:
   an accessor configured to access a part of the wholesale billing data, and to identify, based on a record from the telephone company, a portion of the accessed wholesale billing data for subsequent data manipulation;
   a generator configured to generate tabulated data from the identified portion of the accessed wholesale billing data, through data manipulation; and
   a comparator configured to compare the tabulated data with the reseller's internal billing information so as to correctly bill the customer;
   wherein the tabulated data is not in EBCDIC data format and the wholesale billing data is in EBCDIC data format;
   wherein the wholesale billing data can have millions of characters, with thousands of identifiers;
   wherein the EBCDIC data format is a mainframe computer data format;
   wherein only a part of the wholesale billing data is accessed and manipulated at a time to conserve memory space; and
   wherein less than 20% of the data accessed can be identified for subsequent data manipulation so that additional memory space is conserved.

2. An apparatus as recited in claim 1 wherein:
   the accessor is further configured to transform the identified portion of the accessed wholesale billing data from one data format to another data format; and
   the generator is further configured to take into consideration at least a user-preference to generate the tabulated data.

3. An apparatus as recited in claim 1 wherein the wholesale billing data includes at least three subsets of data, namely recurring charge data, usage summary and toll usage details.

4. An apparatus as recited in claim 3 wherein:
   the monthly recurring charge data includes billing telephone numbers and station numbers;
   the usage summary includes billing telephone numbers;
   the toll usage details include station numbers; and
   the usage summary is linked to the toll usage details through the monthly recurring charge data.

5. An apparatus as recited in claim 1 wherein the comparator depends on descriptions related to Universal Service Ordering Code.

6. An apparatus as recited in claim 1 wherein the apparatus has a single user interface.

7. An apparatus as recited in claim 1 wherein:
   the wholesale billing data includes a set of monthly recurring charge data; and
   the apparatus is further configured to identify the set of monthly recurring charge data by a process including the steps of:
   identifying a billing telephone number;
   identifying a Universal Service Ordering Code;
   identifying a Universal Service Ordering Code quantity; and
   identifying a Universal Service Ordering Code rate.

8. An apparatus as recited in claim 7 wherein:

the billing telephone number is a 10-digit numeric number;

the Universal Service Ordering Code is apiece of 5-character long alpha numeric data;

the Universal Service Ordering Code quantity is a 9-digit numeric number; and the Universal Service Ordering Code rate is a 11-digit numeric number.

* * * * *